United States Patent
Chandhoke et al.

(10) Patent No.: US 10,110,679 B2
(45) Date of Patent: Oct. 23, 2018

(54) TIMED FUNCTIONS FOR DISTRIBUTED DECENTRALIZED REAL TIME SYSTEMS

(71) Applicant: NATIONAL INSTRUMENTS CORPORATION, Austin, TX (US)

(72) Inventors: Sundeep Chandhoke, Austin, TX (US); Aljosa Vrancic, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 153 days.

(21) Appl. No.: 14/840,462

(22) Filed: Aug. 31, 2015

(65) Prior Publication Data

US 2016/0359978 A1 Dec. 8, 2016

Related U.S. Application Data

(60) Provisional application No. 62/169,973, filed on Jun. 2, 2015.

(51) Int. Cl.
| | |
|---|---|
| G06F 15/16 | (2006.01) |
| H04L 29/08 | (2006.01) |
| G06F 9/48 | (2006.01) |
| H04L 12/40 | (2006.01) |
| H04L 12/403 | (2006.01) |

(52) U.S. Cl.
CPC .......... *H04L 67/125* (2013.01); *G06F 9/4887* (2013.01); *H04L 12/40* (2013.01); *H04L 12/403* (2013.01)

(58) Field of Classification Search
CPC ............... H04L 29/08072; H04L 29/06; H04L 29/08981; H04L 12/403; H04L 12/2803; H04N 21/4305; H04J 3/0685; H04J 3/0664; H04J 3/0632; H04J 3/0688

USPC .......................................................... 709/208
See application file for complete search history.

(56) References Cited

U.S. PATENT DOCUMENTS

| | | | | |
|---|---|---|---|---|
| 6,034,960 A | * | 3/2000 | Beshai | H04L 12/5602 370/395.4 |
| 7,457,322 B1 | * | 11/2008 | Flood | G05B 19/054 370/503 |
| 7,697,419 B1 | * | 4/2010 | Donthi | H04L 49/65 370/220 |
| 2003/0031208 A1 | * | 2/2003 | Anehem | H04W 28/14 370/474 |

(Continued)

*Primary Examiner* — Mahran Abu Roumi
(74) *Attorney, Agent, or Firm* — Meyertons Hood Kivlin Kowert & Goetzel, P.C.; Jeffrey C. Hood

(57) ABSTRACT

Generating a schedule for a distributed real time system. At least one schedule generator may receive temporal properties from respective timed functions executing on master devices, where each master device is connected to a respective plurality of slave devices. Each master includes one or more timed functions configured to control timing of physical input and/or output operations for the respective plurality of slave devices, and streams between the master device and the respective plurality of slave devices. The schedule generator may receive associations between the timed functions and streams between master devices, and generate respective schedules for the masters based at least in part on the temporal properties and the associations. The respective schedules may be distributed to the master devices, and are useable by the master devices to control execution of the timed functions and the streams between the master devices in real time in a coordinated manner.

25 Claims, 20 Drawing Sheets

(56) References Cited

U.S. PATENT DOCUMENTS

2003/0177154 A1\* 9/2003 Vrancic ................... G06F 1/12
708/160
2014/0071982 A1\* 3/2014 Chandhoke .............. H04J 3/06
370/355

\* cited by examiner

TIMED FUNCTIONS FOR DISTRIBUTED DECENTRALIZED REAL TIME SYSTEMS

PRIORITY DATA

This application claims benefit of priority to U.S. Provisional Application Ser. No. 62/169,973, titled "Timed Functions for Distributed Decentralized Real Time Systems", filed Jun. 2, 2015, whose inventors are Sundeep Chandhoke and Aljosa Vrancic, which is hereby incorporated by reference in its entirety as though fully and completely set forth herein.

FIELD OF THE INVENTION

The present invention relates to the field of distributed systems, and more particularly to timed functions for distributed decentralized real time systems.

DESCRIPTION OF THE RELATED ART

Hard real time Ethernet based fieldbus technologies that use time-based synchronization (e.g., EtherCAT (Ethernet for Control Automation Technology) and PROFINET-IRT (PROFINET Isochronous Real Time)) schedule real time streams on the network to ensure timeliness of data delivery from the physical inputs (sensors) to the control function and from the control function to the physical outputs (actuators). These technologies generally operate in the traditional fieldbus model where one or more control functions are implemented on one "master" device and the sensors and actuators (physical inputs and outputs) are implemented on or by one or more "slave" devices. This master-slave model defines a centralized control architecture where the input/output (I/O) is decentralized but the control functions are centralized. An exemplary prior art master/slave system with this architecture is shown in prior art FIG. 1A. As may be seen, in this architecture, the slaves (slave devices) do not implement the main control functionality; their primary purpose is to serve physical input data to the centralized control function(s) implemented on the master (master device), and to receive output data from the centralized control function(s) on the master and update the physical outputs. This approach simplifies the task of a schedule generator calculating the network schedule for the real time (data) streams considerably, since the schedule generator only needs to coordinate the reading of the physical inputs (input latch) on each slave device with the arrival time of a real time stream, and the writing of the physical outputs (output update) on each slave with the transmission time of a real time stream.

However, this master-slave approach (centralized distributed model) is not suited for distributing the control function among multiple masters (master devices or processes). In this centralized distributed model there is typically only one input/output update (I/O scan) for each control function implemented on the master, so the schedule generator has to determine a common time (referred to as a synchronization point) when all the slaves latch their inputs, and a common time when the slaves update their outputs for the I/O scan. As shown in prior art FIG. 1B, this is a rather simple calculation for the schedule generator because the synchronization point can be scheduled separately for inputs and outputs at any time on the slave devices during the compute time on the master. This way when the I/O scan runs, the real time streams from the slaves provide the master with new data latched at the same input synchronization point on all the slave devices. New data received by the slaves from the master is stored on the slaves and updated at the output synchronization point at the same time on all the slaves.

New time-sensitive networking technologies being defined in IEEE 802.1 enable coexistence of real time traffic with non-real time traffic on the same network, thereby permitting the "masters" (e.g., master devices) of independent fieldbus networks to exchange data amongst themselves in real time (with guarantees in timeliness of delivery). An exemplary prior art decentralized distributed system is illustrated in prior art FIG. 2, where, as may be seen, a device implementing a centralized schedule generator is connected via a switch (or bridge) to a plurality of master devices, each master device being coupled to a respective plurality of slave devices. As indicated in the Legend, these slave devices implement I/O functionality with respect to various devices attached thereto, e.g., actuators, sensors, motors, etc., as well as the master devices. More specifically, as FIG. 2 indicates, the I/O functionality of a slave device may include implementation of interfaces to attached devices, e.g., sensors and actuators (including motors), management of output data received from the slave's master in one or more streams, and generation of one or more streams (i.e., data streams) to send input data to the master.

Exemplary data streams are also illustrated in FIG. 2, where, as indicated in the top right of the figure, stream 1 (so labeled) is an exemplary input stream from a "drive" slave device (that drives a motor) to Master A, stream 2 is an exemplary output stream from Master A to the "drive" slave device, e.g., control signals for controlling the motor, stream 3 is an exemplary stream from Master A to Master C, and stream 4 is an exemplary stream from Master D to Master A.

This architecture may permit new models for control functions to be defined where control implemented on one master can be distributed among multiple masters. However, there are currently no methods that enable a centralized schedule generator to schedule control functions implemented on each master with respect to each other and with respect to a network's schedule for real time streams exchanged between the masters.

SUMMARY OF THE INVENTION

Various embodiments of a system and method for scheduling a distributed decentralized real time system are presented below.

An apparatus for scheduling a decentralized distributed real time system may be provided that includes at least one centralized configuration device, configured to implement at least one schedule generator. The at least one centralized configuration device may be configured to couple to a plurality of master devices, where each master device is connected to a respective plurality of slave devices. Each master device may include one or more timed functions configured to control timing of physical input operations and/or physical output operations for the respective plurality of slave devices, and streams between the master device and the respective plurality of slave devices. The at least one schedule generator may be configured to receive temporal properties from respective timed functions executing on the master devices, and to receive associations between the timed functions and streams between the master devices (which are distinct from streams between a master device and its slave devices). The at least one schedule generator may be further configured to generate respective schedules for the master devices based at least in part on the temporal properties and the associations, and distribute the respective schedules to the master devices, where the respective schedules are useable by the master devices to control execution of the timed functions and the streams between the master devices in real time in a coordinated manner. In some embodiments, the apparatus may be included in a decentralized distributed real time system that includes the plurality of master devices (and respective pluralities of slave devices connected thereto).

Thus, the at least one schedule generator executing on at least one centralized configuration device may perform a method in which temporal properties are received from respective timed functions executing on each of a plurality of master devices, as well as associations between the timed functions and streams between the master devices, i.e., associations of the timed functions with streams communicated or transmitted from one master device to another master device. The at least one schedule generator may then generate the respective schedules for the master devices based at least in part on the temporal properties and the associations, and distribute the respective schedules to the master devices, whereby the master devices control execution of the timed functions and the streams between the master devices in real time in a coordinated manner.

In some embodiments, each slave device is configured to perform physical input operations, and generate streams to send to its master device and/or perform physical output operations, and consume streams from its master device. Each master device may further include a network interface configured to communicate streams to and from other master devices based on a respective schedule.

In one embodiment, each respective schedule includes a schedule for execution and coordination of the timed functions of the master device, and a schedule for transmission of the streams produced by the master device to other master devices.

In various embodiments, the temporal properties may be with respect to execution of the timed function and/or coordination of the physical input operations and/or physical output operations of slave devices under control of the timed function with respect to other timed functions. The other timed functions may be or include one or more of: timed functions on the same master device, or timed functions on other master devices.

In some embodiments, the at least one schedule generator may also receive system application requirements, and network constraints and network topology information, and generating the respective schedule for each master device may be based further on the system application requirements, and the network constraints and network topology information.

BRIEF DESCRIPTION OF THE DRAWINGS

A better understanding of the present invention can be obtained when the following detailed description of the preferred embodiment is considered in conjunction with the following drawings, in which.

Figure 1A:
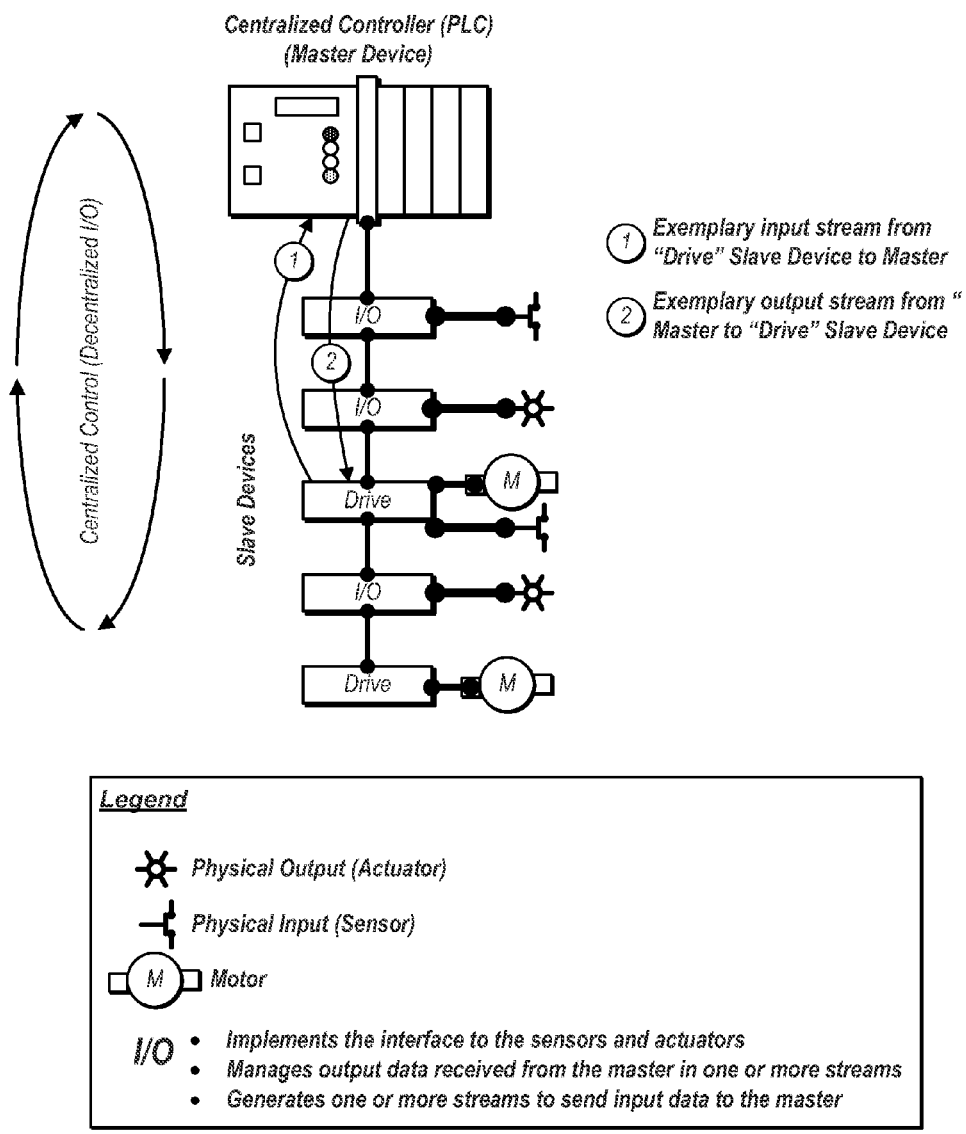
FIG. 1A illustrates a centralized master/slave system, according to the prior art.
Figure 1B:
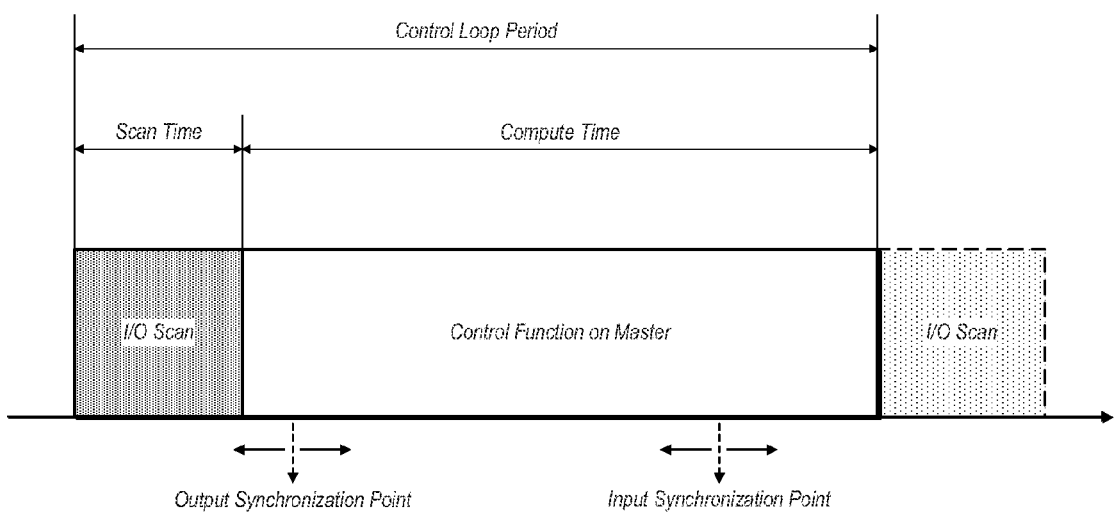
FIG. 1B illustrates synchronization and timing in the centralized master/slave system of FIG. 1A, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. application Ser. No. 14/054,227, titled "System and Method for Interoperability Between Multiple Networks", filed Oct. 15, 2013.

U.S. application Ser. No. 14/511,863, titled "System and Method for Interoperability Between Multiple Networks", filed Oct. 10, 2014.

U.S. application Ser. No. 14/072,297, titled "Lossless Time Based Data Acquisition and Control in a Distributed System", filed Nov. 5, 2013.

U.S. application Ser. No. 14/512,203, titled "Lossless Time Based Data Acquisition and Control in a Distributed System", filed Oct. 10, 2014.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized", "globally optimum", and "globally optimal" mean "globally improved with respect to specified criteria". One example of a global optimization method is differential evolution, which optimizes a problem (system or process) via iterative improvement of candidate solutions with respect to some specified measure of quality.

Latency Requirements—refers to the latency (time/duration) desired by a system application for a stream regarding the time from transmission from the master device producing the stream to the time when it is received by a master device consuming the stream.

Period—refers to the cyclic rate at which the stream is transmitted, i.e., the duration of one cycle.

Timed Function Characterization—refers to the determination of the worst case execution time (WCET), and the minimum and maximum period for execution of the timed function.

Time Sensitive Stream Bandwidth—refers to the data transmitted every cycle in a stream.

Time Sensitive Stream Characterization—refers to the (transmission) tx copy time and (reception) rx copy time required by a stream on a master device.

Path Computation—refers to an algorithm to compute optimal routing of a stream from a master device producing the stream to a master device consuming the stream.

Performance Metrics of the Network—refers to delays (i.e., latencies) encountered by a stream as it passes through a bridge/switch and propagation (e.g., cable) delay.

Link Speed—refers to network bandwidth available for transmission of a stream (e.g., 1 Gigabit/sec, 10 Gigabit/sec, and so forth).

Network Topology—refers to or specifies the connectivity of components of a network, e.g., the bridges/switches connecting one master device to another.

Physical I/O—refers to input and output signals for monitoring/controlling a physical system, process, or environment. For example, one exemplary physical input is a physical signal derived from a sensor or a motor drive indicating the present condition of the environment or system connected to the sensor or motor drive. Similarly, one exemplary physical output is a physical signal used to change the state of an actuator or a motor drive with the intention of causing a change to the environment or system connected to the actuator or motor drive.

Centralized Configuration Device—refers to a configuration device in a distributed system, i.e., in a networked system, that operates to configure other devices in the system, where the configuration device's functionality is not distributed, but rather is comprised within a single device or entity. In other words, the configuration device provides for centralized configuration functionality in an otherwise distributed system.

Figure 3:
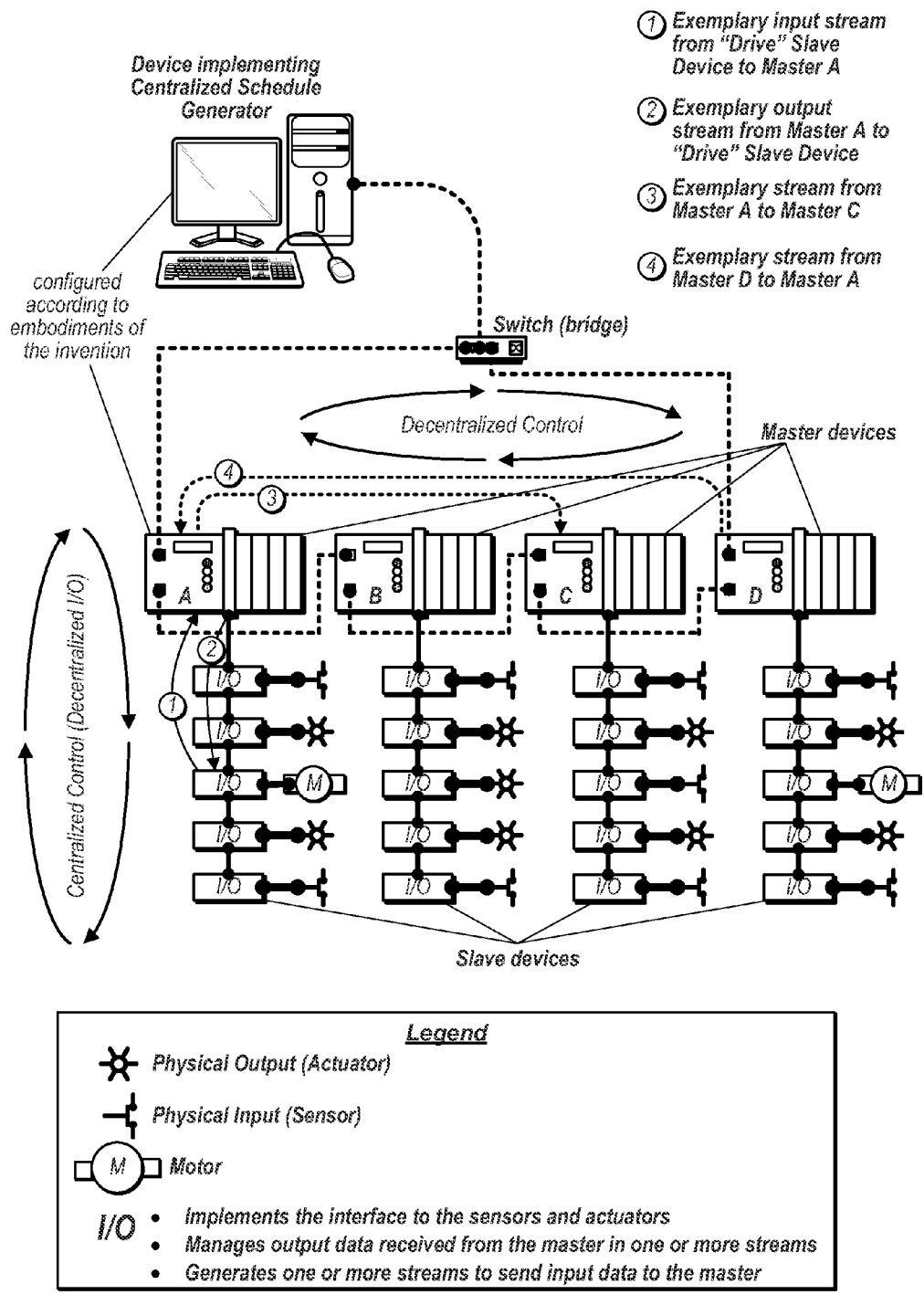
FIG. 3 illustrates an exemplary decentralized distributed system, according to one embodiment.

FIG. 3—Exemplary Decentralized Distributed System

Figure 2:
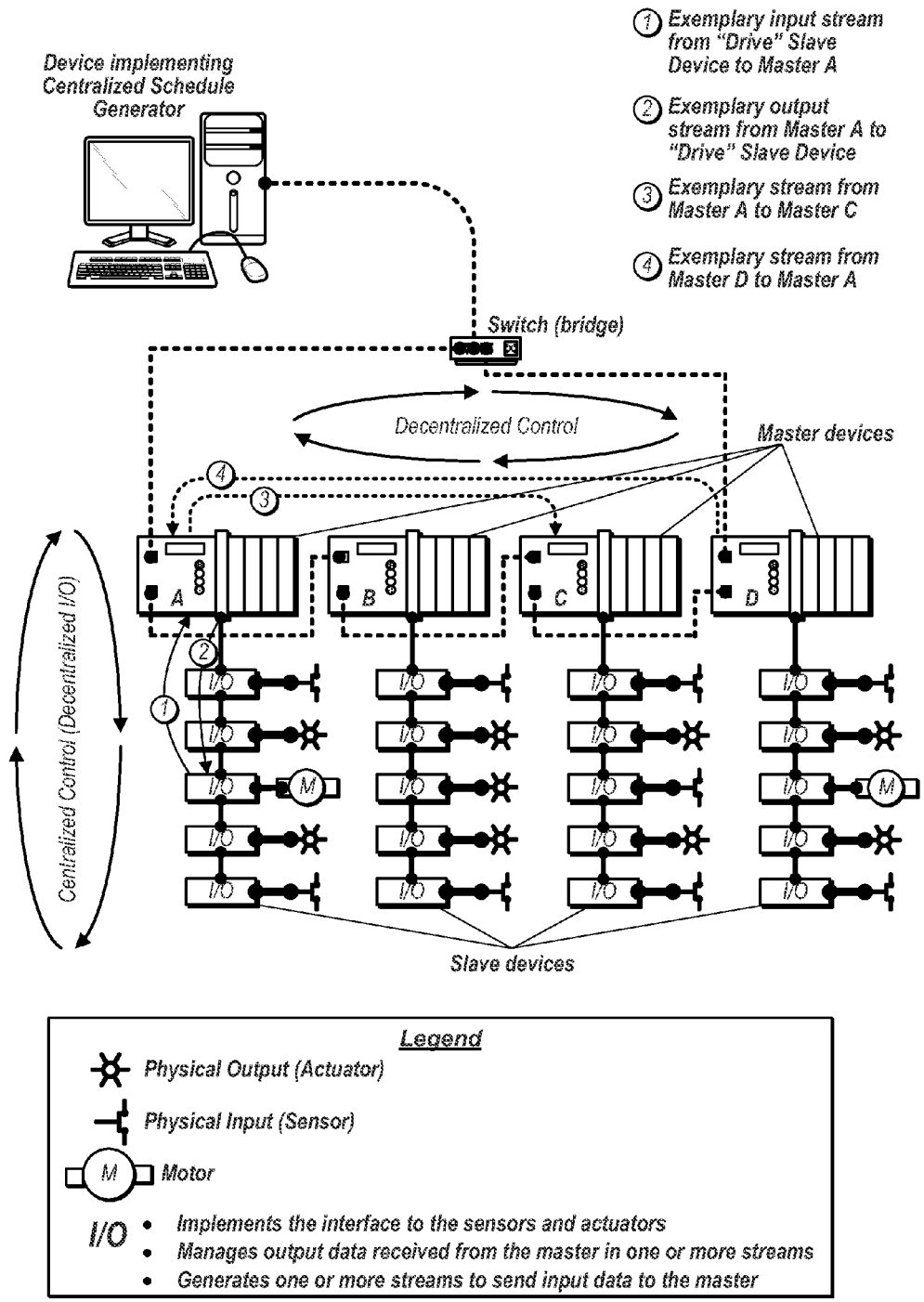
FIG. 2 illustrates a decentralized distributed master/slave system, according to the prior art.

FIG. 3 illustrates an exemplary decentralized distributed system, according to one embodiment. As shown, the physical hardware and architecture of this exemplary system are similar to, or even the same as, the system of FIG. 2, but the centralized configuration device and master devices are configured according to embodiments of the present techniques, thus providing for real time distributed control.

A master device in this new decentralized control model should coordinate one or more control functions implemented on it with the arrival (or reception) and transmission of one or more real time streams exchanged between other masters and with the control functions executing on them. While scheduling of these real time streams can be performed in a manner similar to the method used by a schedule generator for Ethernet-based fieldbuses as described in the white paper titled "Profinet IRT message scheduling", by Z. Hanzalek, P. Burget, P. Sucha, Czech Technical University in Prague, Faculty of Electrical Engineering, to synchronize multiple control functions with respect to the real time stream schedule on the network requires new information from each master to be provided to the schedule generator.

In the (prior art) centralized model (or architecture) physical inputs and outputs are expected to be synchronized across the fieldbus and with respect to its master. Synchronized I/O implies a precise timing relationship between I/O performed on one device with respect to another. The decentralized distributed model has a similar requirement of synchronizing inputs and outputs, but across multiple masters, which implies I/O implemented on slaves across multiple fieldbuses.

As noted above, in the prior art centralized distributed model (e.g., of FIG. 2) there is typically only one input/output update (I/O scan) for each control function implemented on the master. In contrast, in the decentralized model disclosed herein, each master may locally execute one or more control functions which directly use the I/O on its fieldbus and indirectly use the I/O from another master's fieldbus. Accordingly, synchronizing the I/O across multiple masters requires additional information provided to the schedule generator so that it can define a common "synchronization point" for all the I/O across various fieldbuses to be coordinated. Various embodiments of this additional information and its use in scheduling distributed control functions and synchronizing I/O by a schedule generator are described below with reference to FIG. 4.

Accordingly, in some embodiments, a decentralized distributed real time system may be provided that includes a plurality of interconnected master devices, where each master device has a plurality of slave devices connected to the master device. Each slave device may be configured to perform physical input operations and generate streams to send to its master device, and/or to perform physical output operations and consume streams from its master device.

Each master device may include one or more timed functions and a network interface. Each timed function may be configured to control timing of the physical input operations and/or physical output operations for the plurality of slave devices. The network interface may be configured to communicate streams to and from other master devices based on a schedule. In some embodiments, the schedule may include a schedule for execution and coordination of the timed functions of the master device, and a schedule for transmission of the streams produced by the master device to other master devices.

Each timed function may be configured to export temporal properties regarding execution of the timed function, and coordination of the physical input operations and/or physical output operations of slave devices under control of the timed function with respect to other timed functions. Each timed function may also be configured to export associations (of the timed function) with streams between the master device and other master devices, i.e., an indication as to which real time data streams (to or from other master devices) are produced or consumed by the timed function.

The schedule for each master device may be generated based at least in part on the temporal properties and the associations, and these schedules may be used by the master devices to control execution of the timed functions and the streams between the master devices in real time in a coordinated manner. In various embodiments, the other timed functions may include one or more of: timed functions on the same master device, or timed functions on other master devices.

In one embodiment, the decentralized distributed real time system may further include at least one centralized configuration device, coupled to the plurality of master devices. For example, the at least one schedule generator may be configured to receive temporal properties from respective timed functions executing on the master devices, and receive associations between the timed functions and the streams between master devices, and generate respective schedules for the master devices based at least in part on the temporal properties and the associations. The at least one schedule generator may also be configured to distribute the respective schedules to the master devices.

Additionally, in some embodiments, the at least one schedule generator may also be configured to receive system application requirements, as well as network constraints and network topology information. The respective schedule for each master device may be generated based further on the system application requirements, and the network constraints and network topology information.

Thus, in some embodiments, an apparatus for scheduling a decentralized distributed real time system may be provided that includes at least one centralized configuration device, configured to implement at least one schedule generator. The at least one centralized configuration device may be configured to couple to a plurality of master devices, where each master device has a plurality of slave devices connected to the master device. Each slave device may be configured to perform physical input operations, and generate streams to send to its master device, and/or perform physical output operations, and consume streams from its master device.

Each master device may include one or more timed functions, where each timed function is configured to control timing of the physical input operations and/or physical output operations for the plurality of slave devices. In some embodiments, each master device may also include a network interface configured to communicate streams to and from other master devices based on a respective schedule.

The at least one schedule generator may be configured to receive temporal properties from respective timed functions executing on the master devices, receive associations between the timed functions and streams between master devices, and generate respective schedules for the master devices based at least in part on the temporal properties and the associations. Each respective schedule may include a schedule for execution and coordination of the timed functions of the master device, and a schedule for transmission of the streams produced by the master device to other master devices. The at least one schedule generator may be further configured to distribute the respective schedules to the master devices, e.g., over the network. The respective schedules may be useable by the master devices to control execution of the timed functions and the streams between the master devices in real time in a coordinated manner. Exemplary embodiments of a method for scheduling such a decentralized distributed system are presented below with respect to FIG. 5.

Figure 4:
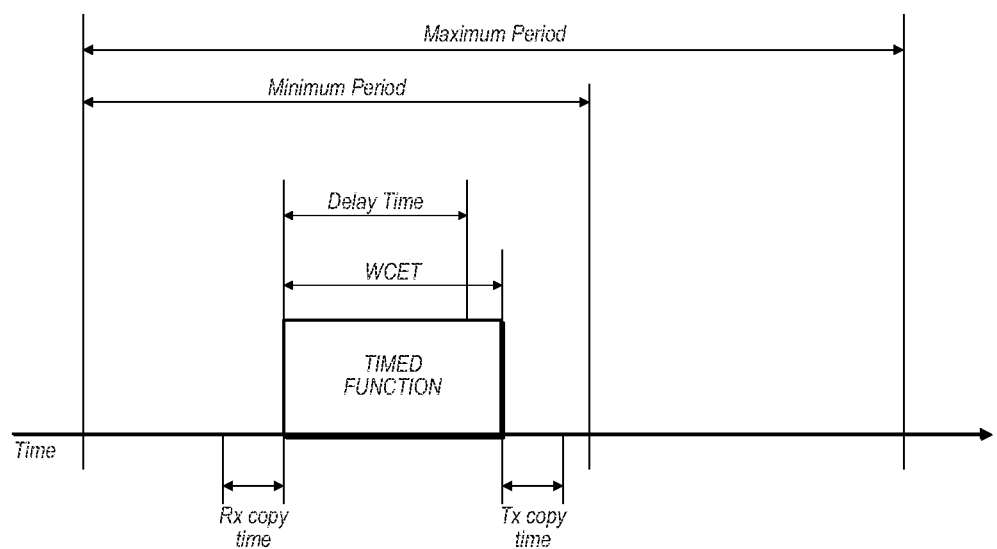
FIG. 4 illustrates exemplary temporal properties of a timed function in the decentralized distributed system of FIG. 3, according to one embodiment.

FIG. 4—Exemplary Temporal Properties of a Timed Function

FIG. 4 illustrates exemplary temporal properties of a timed function in the decentralized distributed system of FIG. 3, according to one embodiment. In some embodiments, the additional information (used to schedule the distributed control functions and synchronize I/O) may include one or more of these temporal properties (or parameters), as illustrated in FIG. 4.

As FIG. 4 shows, a timed function, so labeled, is executed by a master over some duration, indicated by the width of the timed function block along the time axis. Due to various temporal properties of the timed function, e.g., respective latencies of various processes or tasks related to the timed function, the total time required for the timed function to complete its operation(s) is generally longer than the timed function's execution time (e.g., width of timed function block).

Exemplary temporal properties (or parameters) of timed functions include, but are not limited to:

1. minimum period—this indicates the fastest rate supported by the timed function (where rate is the inverse of period). This information may be used by the schedule generator to define the fastest real time stream update rate for this function. Note that this property or parameter does not necessarily reflect the rate of the control loops encapsulated by the timed function; rather, it describes the fastest rate at which the function can accept a new update by a real time stream or provide data that can be transmitted using a real time stream.

2. maximum period—this indicates the slowest rate supported by the timed function (again, where rate is the inverse of period). In case of measurement functions, this value relates to the maximum buffering that the master can accommodate for this timed function before it starts losing data.

3. delay time—this is the minimum time required by the function to perform a synchronized operation (such as an input latch or an output update) after it has started. This time may be used by the schedule generator to schedule an appropriate start time for the timed function, and may ensure that the schedule generator calculates a synchronization point such that when the function executes, it has enough time to meet the synchronization point deadline, i.e., to have the appropriate state at the synchronization point. In some embodiments, in cases where the timed function has a faster local control loop rate (multiple input updates/output latches per timed function period), one of the iterations of the local control loop may coordinate with the synchronization point, which may allow timed functions with different rates to synchronize their input and output operations.

4. WCET—this is the worst case execution time of the timed function. This property or parameter may allow the schedule generator to determine the appropriate transmission time for a real time stream that is expected to carry the data produced by the timed function. In cases where the function has a faster local control loop rate, the WCET may determine (or specify) the number of iterations of the local control loop in one period of the real time stream (and thereby the timed function).

5. Rx (receive) copy time—this property or parameter is a per stream value which indicates the maximum amount of time that may elapse from the moment the last bit of data received over the network until the data is ready to be consumed by a timed function. This information may be required to ensure that the real time stream being received on a master device is scheduled such that there is enough time for the data to be made available in memory before the timed function starts executing.

6. Tx (transmit) copy time—this property or parameter is a per stream value which indicates the maximum time elapsed from the moment the timed function is finished writing data to the moment the first bit appears on the network. This information may be required to ensure that the real time stream being transmitted from a master device is scheduled such that there is enough time for the data to be made available in memory before the stream starts its transmission.

In some embodiments, both Rx copy time and Tx copy time may need to be aggregated when a timed function consumes or produces multiple real time streams.

It should be noted that the above properties or parameters are exemplary only, and that other temporal properties or parameters may be used as desired. Additionally, these properties or parameters may be referred to by different names.

In some embodiments, the additional information may also include association of real time streams (to or from other master devices) with a timed function, i.e., an indication of the real time streams associated with the timed function that are targeted to or from other master devices. In some embodiments, there may be two types of association: the timed function either consumes the data contained in the stream or the function produces the data contained in the stream. In other words, the two types of association may include 1) association of a real time stream whose data are to be consumed by the timed function; or 2) association of a real time stream whose data are to be produced by the timed function.

This information may be required by the schedule generator to ensure that it can align real time streams with the start and termination of a timed function.

Below are described various embodiments of the present techniques wherein such additional information is used to schedule execution and coordination of timed functions of a master device and to schedule transmission of real time streams produced by the master device.

Figure 5:
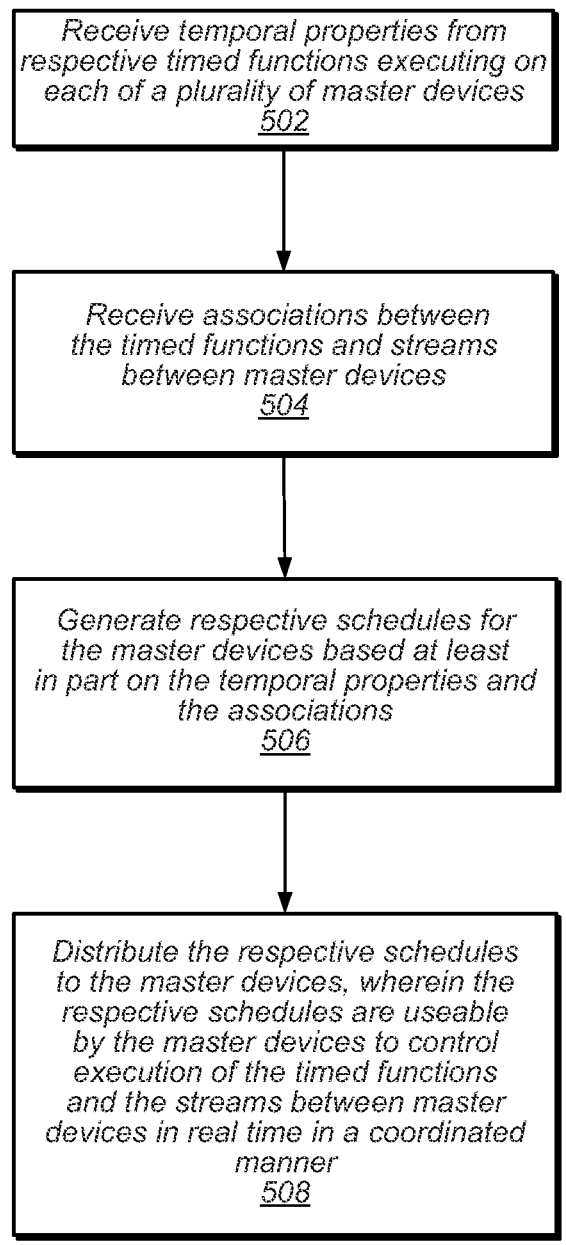
FIG. 5 is a flowchart diagram illustrating one embodiment of a method for scheduling a decentralized distributed system.

FIG. 5—Flowchart of a Method for Scheduling a Decentralized Distributed Real Time System FIG. 5 illustrates a method for scheduling a decentralized distributed real time system, according to various embodiments. The method shown in FIG. 5 may be used in conjunction with any of the computer systems or devices shown in the Figures, among other devices. In some embodiments, the method may be performed by at least one schedule generator executing on at least one centralized configuration device. In various embodiments, some of the method elements shown may be performed concurrently, in a different order than shown, or may be omitted. Additional method elements may also be performed as desired. As shown, this method may operate as follows.

First, in 502, temporal properties may be received from respective timed functions executing on each of a plurality of master devices. Exemplary temporal properties are described above with respect to FIG. 4. Each master device may have a plurality of slave devices connected to the master. e.g., over a network.

Each master device may include one or more timed functions. Each timed function may be configured to control timing of the physical input operations and/or physical output operations for the plurality of slave devices. In one embodiment, the one or more timed functions may be configured to control timing of streams between the master device and the respective plurality of slave devices. In some embodiments, each master device may further include a network interface, which may be configured to communicate streams to and from other master devices based on a schedule.

In 504, associations between the timed functions and streams between master devices may be received. In other words, associations of the timed functions with streams communicated from one master device to another master device may be received. In various embodiments, the associations may be received from any of a variety of sources, e.g., the timed functions, a server, database, a user, etc., as desired. For example, the timed functions may retrieve their respective associations from a server/database and export them, e.g., to the at least one centralized configuration device/schedule generator for use in generating schedules for the master devices.

In 506, respective schedules may be generated for the master devices based at least in part on the temporal properties and the associations. In some embodiments, each respective schedule may include a schedule for execution and coordination of the timed functions of the master device, and a schedule for transmission of the streams produced by the master device to other master devices.

In 508, the respective schedules may be distributed to the master devices, e.g., over the network. The respective schedules may be useable by the master devices to control execution of the timed functions and the streams between the master devices in real time in a coordinated manner.

In some embodiments, the method may further include the at least one schedule generator receiving system application requirements, and receiving network constraints and network topology information. The above generating of the respective schedules (506) may be further based on the system application requirements, and the network constraints and network topology information.

Exemplary Embodiments

The following describes various further embodiments of the above techniques, although it should be noted that the embodiments described are exemplary only, and are not intended to limit the invention to any particular form or function.

In some embodiments, the method of FIG. 5 may be implemented on or by an apparatus for scheduling a decentralized distributed real time system. The apparatus may include at least one centralized configuration device, configured to implement at least one schedule generator, and further configured to couple to a plurality of master devices, where each master device is connected to a respective plurality of (or in some embodiments, one or more) slave devices. Each master device may include one or more timed functions configured to control timing of physical input operations and/or physical output operations for the respective plurality of slave devices, as well as streams between the master device and the respective plurality of slave devices.

The at least one schedule generator may be configured to receive temporal properties from respective timed functions executing on the master devices, receive associations between the timed functions and streams between master devices, and generate respective schedules for the master devices based at least in part on the temporal properties and the associations, after which the at least one schedule generator may distribute the respective schedules to the master devices. The respective schedules are then useable by the master devices to control execution of the timed functions and the streams between the master devices in real time in a coordinated manner.

In some embodiments, each slave device may be configured to perform physical input operations, and generate streams to send to its master device, and/or perform physical output operations, and consume streams from its master device. The temporal properties may be with respect to execution of the timed function and/or coordination of the physical input operations and/or physical output operations of slave devices under control of the timed function with respect to other timed functions. These other timed functions may include one or more of timed functions on the same master device, or timed functions on other master devices.

In at least one embodiment, the at least one schedule generator may be further configured to receive system application requirements and to receive network constraints and network topology information. The respective schedule for each master device may accordingly be generated based further on the system application requirements, and the network constraints and network topology information.

Embodiments of the apparatus described above may be incorporated in various embodiments of a centralized distributed real time system. For example, in one embodiment, the centralized distributed real time system may include a plurality of interconnected master devices, wherein each master device has a respective plurality of slave devices connected to the master device, as described above. For example, each master device may include one or more timed functions, where each timed function is executable on the master device to export temporal properties for the timed function, and/or associations with streams produced or consumed by the timed function (where the streams are targeted to or from other master devices). As also discussed above, a respective schedule for each master device may be generated based at least in part on the temporal properties and the associations. The master devices may be configured to receive the respective schedules, and use the respective schedules to control execution of the timed functions and the streams between the master devices in real time in a coordinated manner. The decentralized distributed real time system may further include at least one centralized configuration device, such as the apparatus described above, coupled to the plurality of master devices, and including at least one schedule generator, configured to receive the temporal properties from respective timed functions executing on the master devices, receive the associations between the timed functions and the streams between master devices, and generate the respective schedules for the master devices.

In some embodiments, a non-transitory computer accessible memory medium may be provided that stores program instructions implementing at least one schedule generator for a decentralized distributed real time system. The program instructions may be executable by at least one centralized configuration device to implement the novel techniques disclosed herein, e.g., embodiments of the method of FIG. 5.

Schedule Generation

The following describes various exemplary embodiments of schedule generation according to the present techniques. As noted above, at least one schedule generator may be implemented on at least one centralized configuration device.

In one embodiment, the at least one schedule generator may compute the start time for the periods (intervals) of the timed-functions as well as a synchronization point which may be used by the timed-function to perform time synchronous operations, e.g., based on system application requirements. Now, to be able to coordinate the timed functions with real time streams, a common time reference point may be required. Accordingly, the concept of a common epoch which is distributed to all devices implementing timed functions is introduced. The at least one schedule generator may determine the start time for the first iteration of a given timed function with respect to this common epoch. Additionally the at least one schedule generator may verify the period for execution of the timed function such that it is greater than or equal to the minimum period specified for the timed-function. In some embodiments, the period may be provided by the user based on application requirements.

Figure 6:
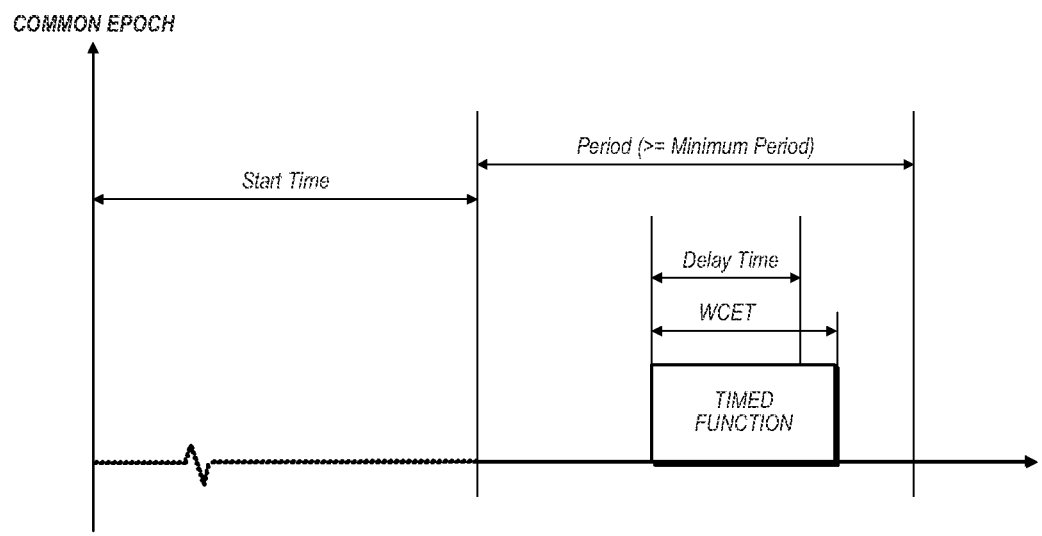
FIG. 6 illustrates start time with respect to a common epoch for a timed function in a decentralized distributed system, according to one embodiment.

FIG. 6 illustrates start time with respect to a common epoch for a timed function in a decentralized distributed system, according to one embodiment. As shown, the start time may provide a common reference point for each timed function, e.g., with respect to time sensitive data transfer. Once the start time occurs or has elapsed, the respective period for the timed function begins, where, as indicated, the period is greater than or equal to the minimum period of the timed function, and may be greater than (or include) the timed function's delay time and WCET.

Figure 7:
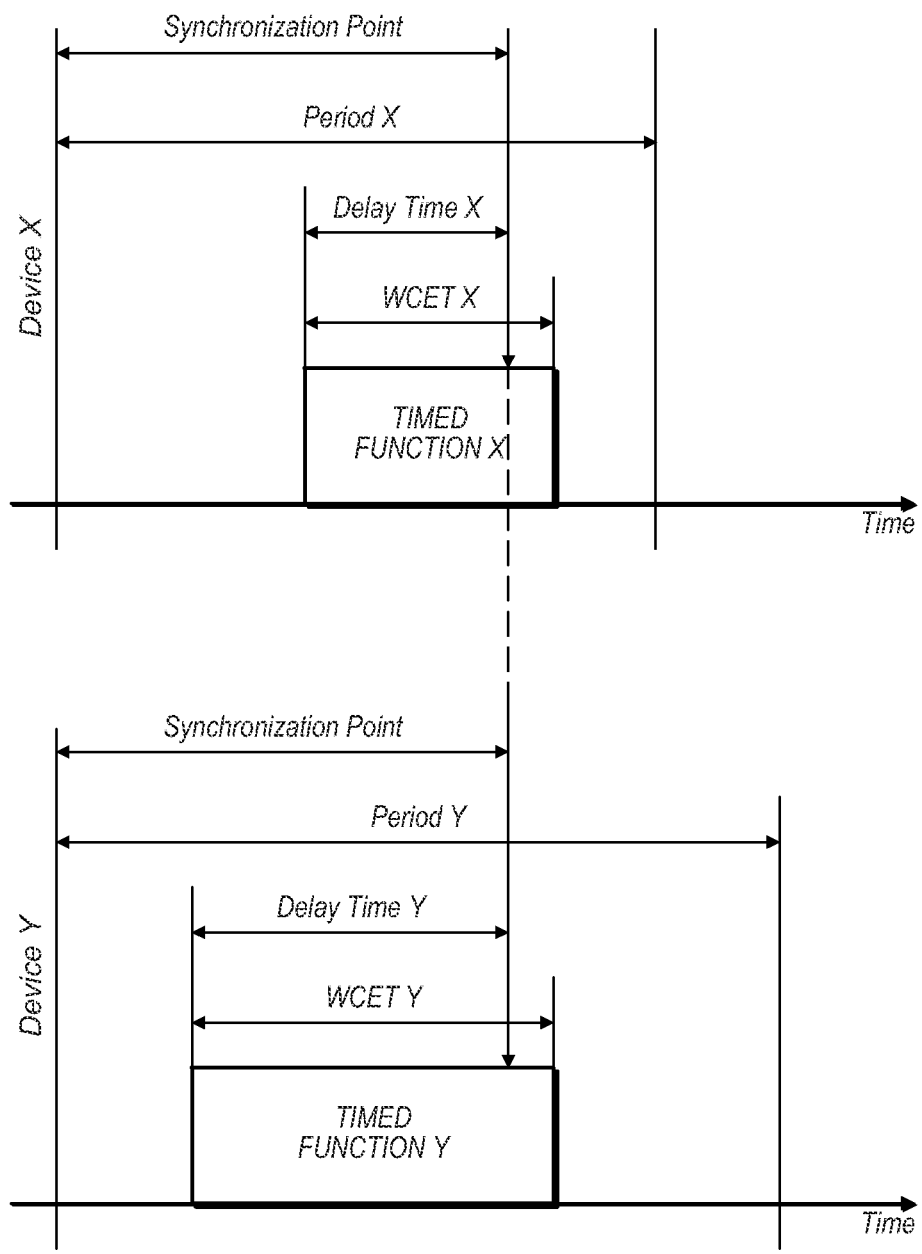
FIG. 7 illustrates a synchronization point for multiple devices in a decentralized distributed system, according to one embodiment.

In some embodiments, to synchronize timed functions so that they may coordinate their time synchronous operations, the at least one schedule generator may compare the delay times of all timed functions, and compute a "synchronization point" that is greater than all the delay times. Given this synchronization point time, each timed function may start its execution at: time<=synchronization point−delay time. FIG. 7 illustrates an exemplary synchronization point for multiple devices in a decentralized distributed system, according to one embodiment. As shown, the synchronization point occurs during execution of the respective timed functions X and Y, and coincides with the expiry of the delay times for each.

Figure 8:
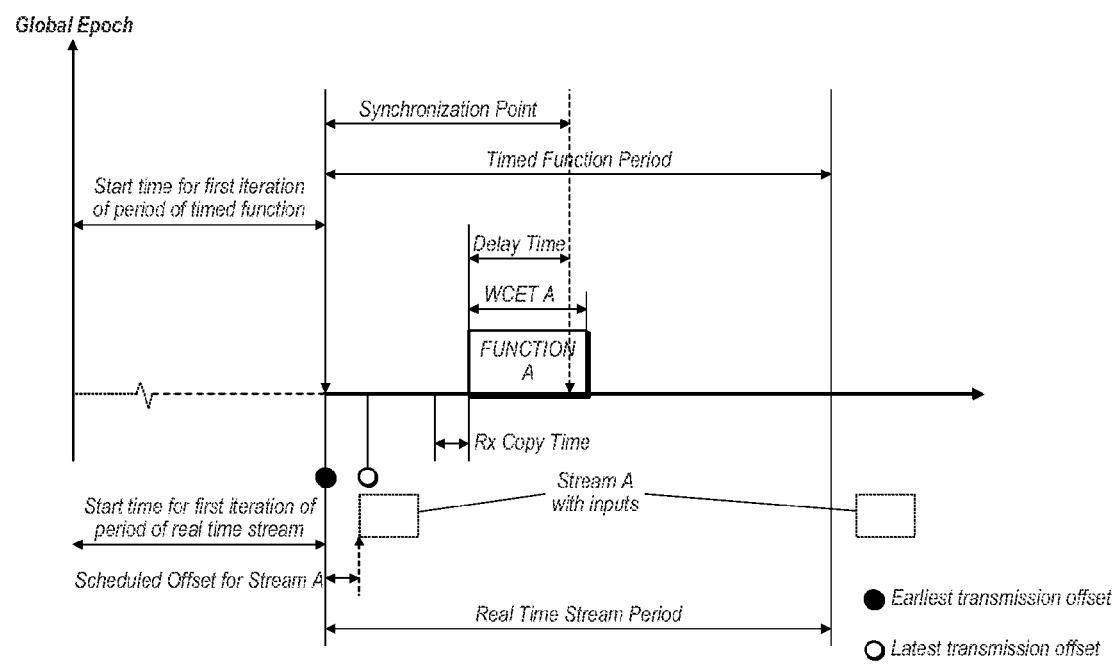
FIG. 8 illustrates an exemplary real time stream schedule for reception in a decentralized distributed system, according to one embodiment.

Based on this information the at least one schedule generator may coordinate real time stream schedule with the timed-functions. For example, the at least one schedule generator may shift the timed functions based on the start-time and the synchronization points to meet the associativity of streams requirement for each timed function. The start of transmission of a real time stream may need to be computed such that it is received by a timed function before starting execution, taking the Rx copy time into account. This may be achieved by configuring the start time of the stream with respect to the common epoch and the precise offset by configuring the offset within the period for the stream. By manipulating the start time of the real time stream with respect to the start time of the timed function, the at least one schedule generator may achieve a higher level of flexibility in meeting the decentralized control application requirements. FIG. 8 illustrates an exemplary real time stream schedule for reception in a decentralized distributed system, according to one embodiment. As illustrated, stream operations for exemplary stream A with the indicated real time stream period may be scheduled with respect to the global epoch (described above), and more particularly, in coordination with related timed function A, where the (start time of the) stream's reception (Rx) may be offset with respect to the start time for a first iteration of the period of the timed function A. This scheduled offset (so labeled in FIG. 8), may be scheduled to start transmission (to the master device) anytime between the earliest and latest transmission offsets, as indicated. As FIG. 8 shows, the stream (stream A with timed function inputs) may accordingly be copied and thus be useable by timed function A by the execution start time of the timed function.

Figure 9:
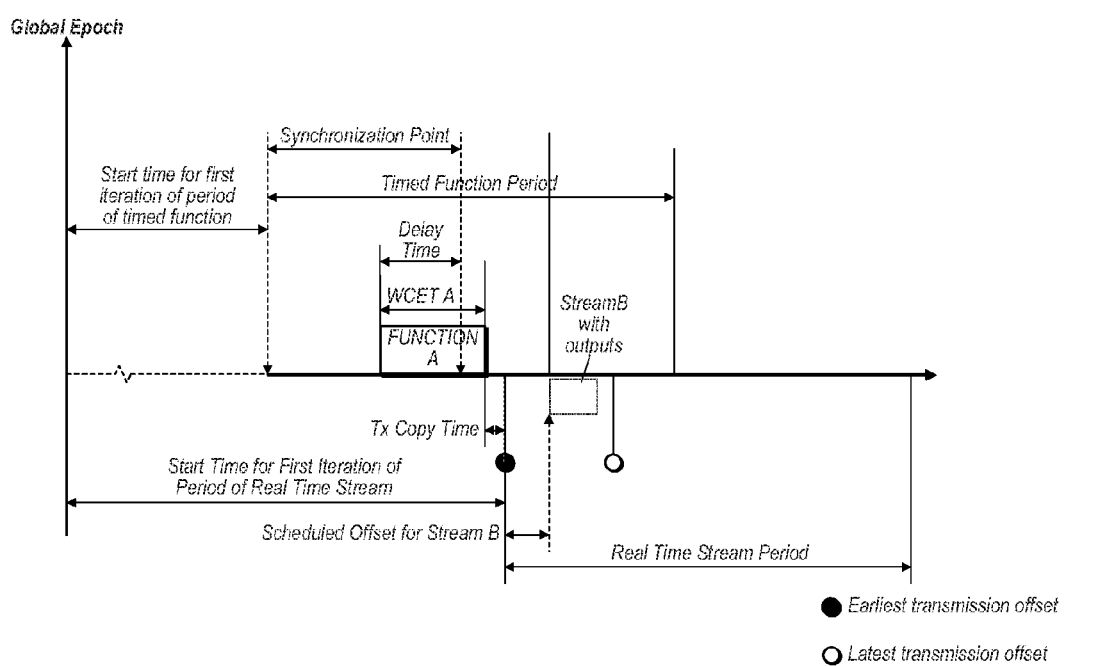
FIG. 9 illustrates an exemplary real time stream schedule for transmission in a decentralized distributed system, according to one embodiment.

The transmission offset of a stream may be constrained by the timed function producing the data it carries. In this case the transmission offset may need to take into account the transmission copy time, Tx copy time, for the stream along with the WCET of the timed function to ensure that the data are ready before transmission. FIG. 9 illustrates an exemplary real time stream schedule for transmission in a decentralized distributed system, according to one embodiment. As FIG. 9 shows, transmission of exemplary stream B (with timed function outputs) may be offset by a value somewhere between an earliest and a latest transmission offset, and may be configured such that by the time stream transmission begins, the timed function A has completed execution and enough time has elapsed for the stream data to be copied for output. It should be noted that the present techniques are not limited to separate field bus and master-master networks; rather, the novel techniques disclosed herein are also applicable when the field bus uses the same network as the master device(s), as described in U.S. application Ser. No. 14/511,863, titled "System and Method for Interoperability Between Multiple Networks", which was incorporated by reference above.

One unique problem regarding the scheduling of timed functions and streams that may need to be addressed is (possible) a requirement for conflating two schedules. For example, in many implementations the network schedule may be managed by a centralized network schedule generator, in which case the timed-function schedule generator may be required to schedule the timed functions and provide the network schedule generator a range of transmission times for the streams. The network schedule generator's operation may then be based on network constraints and performance metrics, and may generate precise transmission times for each stream. In some embodiments, the method may utilize two levels of schedule generation, and so may accordingly utilize two schedule generators, e.g., a centralized network schedule generator and a timed function (or system application) schedule generator, although any other names may be used as desired.

Figure 10:
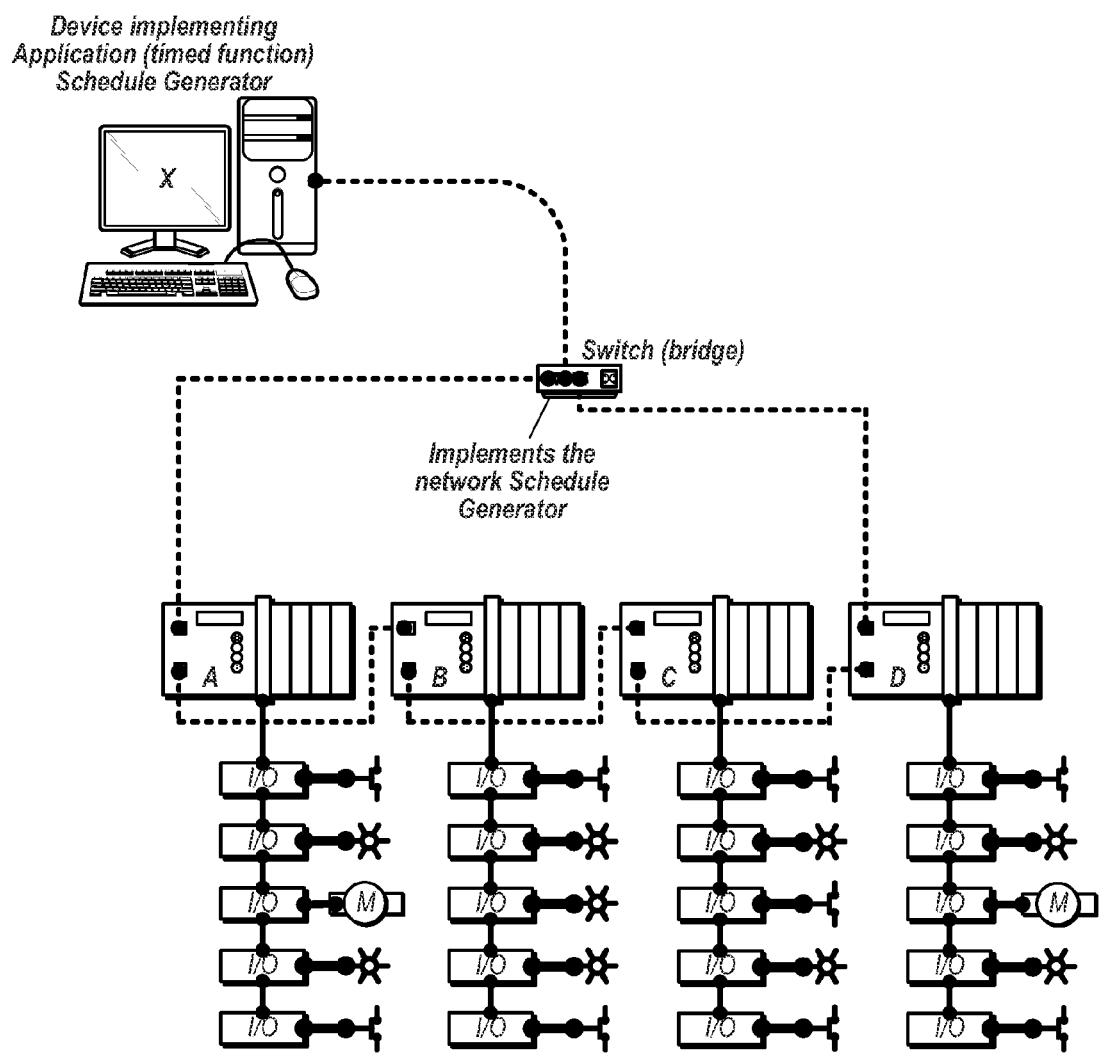
FIG. 10 illustrates an exemplary decentralized distributed system with two schedule generators, according to one embodiment.

FIG. 10 illustrates an exemplary decentralized distributed system with two schedule generators, according to one embodiment. As indicated, in the embodiment shown, the switch (bridge) may implement the centralized network schedule generator, and the (host) device X (so labeled) may implement the timed function (or system application) schedule generator.

Figure 11:
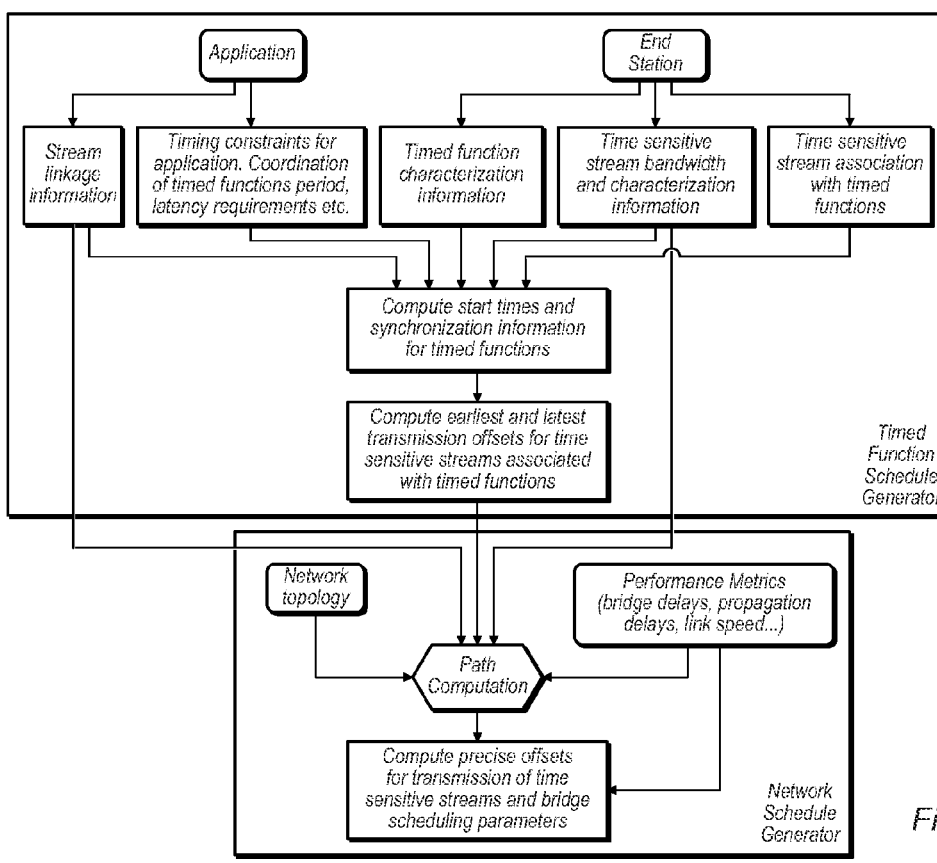
FIG. 11 illustrates exemplary operation of the two schedule generators of FIG. 10, according to one embodiment.

FIG. 11 illustrates exemplary operation of the two schedule generators of FIG. 10, according to one embodiment, whereby the two levels of schedule generation mentioned above may be performed. As indicated, in the embodiment shown, the timed function schedule generator may receive stream linkage information that specifies the master device producing the stream and the master device consuming the stream and timing constraints for the system application, e.g., coordination of timed functions, period, latency requirements, and so forth, from the system application (labeled "Application" in the figure), and may further receive timed function characterization information, time sensitive stream bandwidth and characterization information, and time sensitive stream associations, and, based at least in part on this received information, may compute start times and synchronization information for timed functions, as well as earliest and latest transmission offsets for time sensitive streams associated with timed functions, as discussed above. As FIG. 11 also shows, the network schedule generator may receive stream linkage information, the computed transmission offsets, and the time sensitive bandwidth and characterization information, from the timed function schedule generator, and may perform path computation (for stream transmission) based on this received information, as well as the network topology and performance metrics, e.g., bridge delays, propagation delays, link speed, and so forth. Once the path computation is performed, the network schedule generator may compute precise offsets for transmission of time sensitive streams and bridge scheduling parameters based on the path computation and the performance metrics, as shown.

Exemplary Uses of Timed Functions

The timed function related techniques described herein may be used to implement various functionalities in a decentralized distributed system, exemplary examples of which are now described, although it should be noted that the applications described are exemplary only, and that timed functions may be used in any other applications as desired.

I/O Scan

Figure 12:
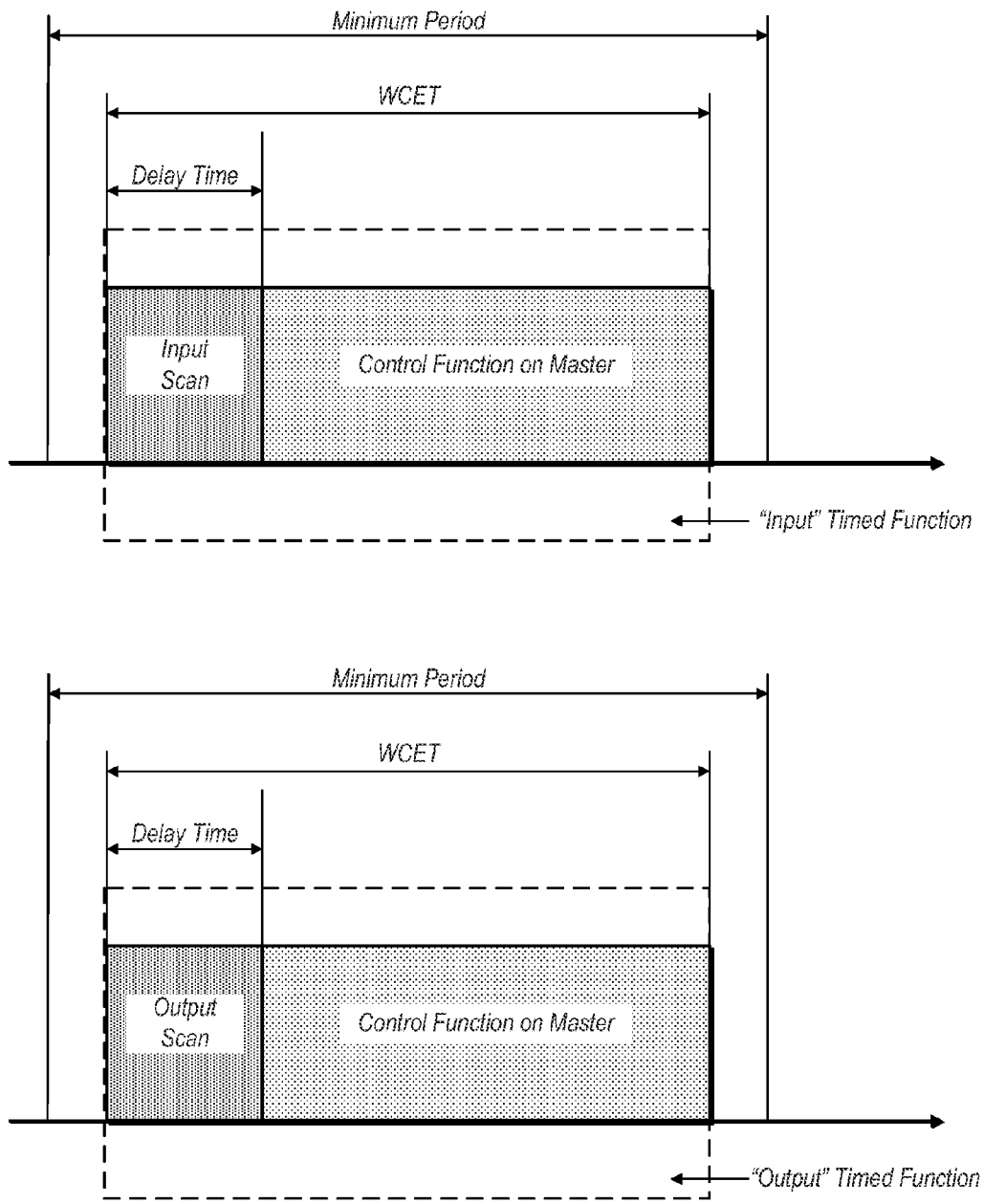
FIG. 12 illustrates an exemplary control function on a master device modeled or implemented as two timed functions, according to one embodiment.

In some embodiments, the example input/output (i.e., I/O scanning) synchronization points for centralized control discussed above with reference to FIG. 4 may be modeled or implemented as two timed-functions. FIG. 12 illustrates an exemplary control function on a master device modeled or implemented as two timed functions, according to one embodiment, where time sensitive input (i.e., input scan) may be considered or treated (or implemented) as an "input timed function" (see top portion of FIG. 12), and time sensitive output (i.e., output scan) may be considered or treated as an "output timed function" (see bottom portion of FIG. 12). Note, however, that the splitting of the scan model into two timed functions does not necessarily imply any change in implementation. In other words, in some embodiments, the implementation may follow the architecture of the exemplary system shown in FIG. 4, but may enable the (at least one) schedule generator to specify two distinct synchronization points which can be aligned with different functions and their local I/O.

Figure 13:
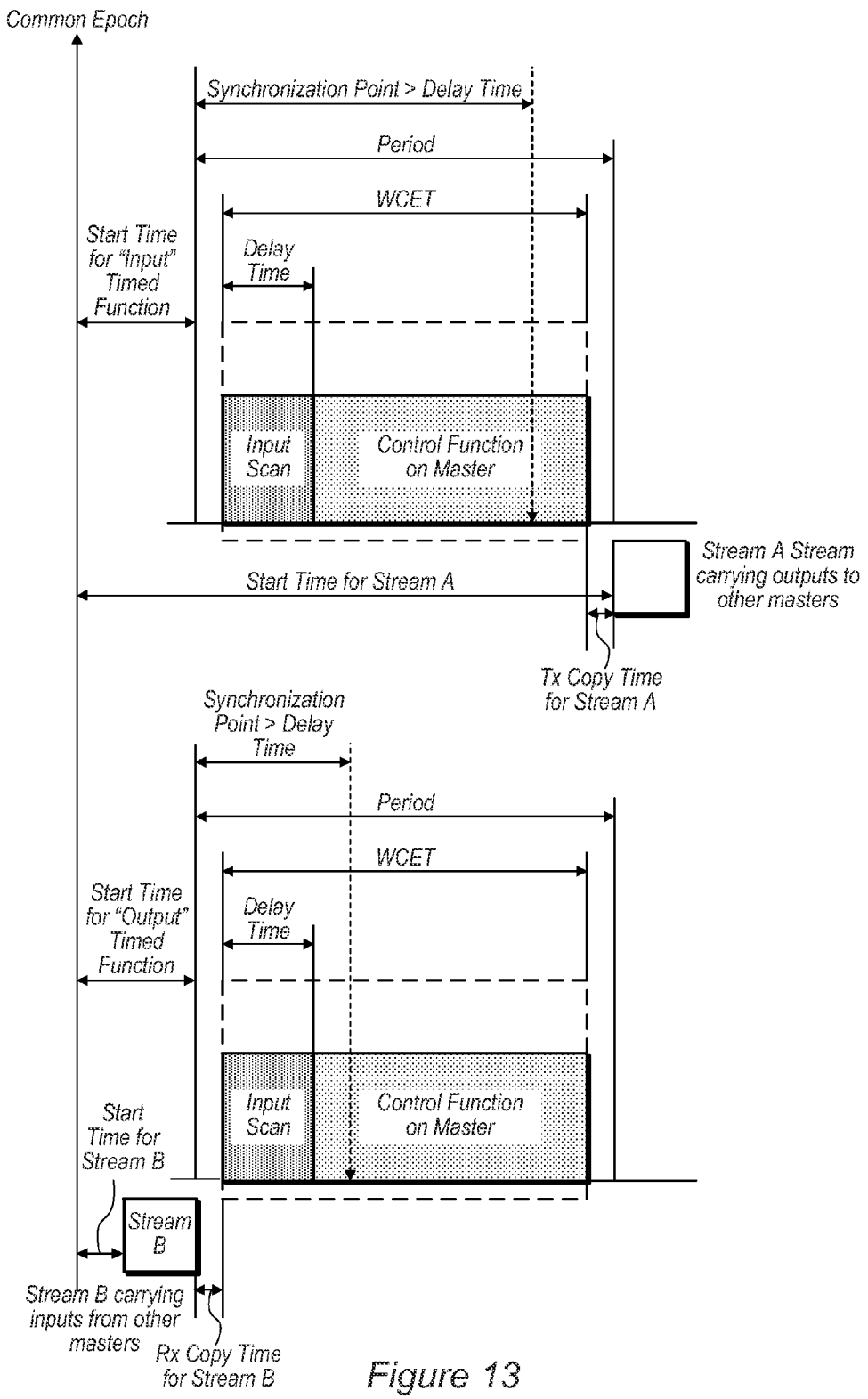
FIG. 13 illustrates exemplary scheduled timed functions, according to one embodiment.

Using the parameters of each function and system application synchronization requirements (across functions), the at least one schedule generator may schedule these functions, as shown in FIG. 13, which illustrates exemplary scheduled timed functions regarding stream A, which carries outputs to other master devices, and stream B, which carries inputs from other master devices, according to one embodiment. One or more of the following parameters may be computed by the at least one schedule generator and provided to the master: for the input timed function, start time, synchronization point, and start time for stream A; and for the output timed function, start time, synchronization point, and start time for stream B. The period may be set by the user based on application requirements, as mentioned earlier. Note that the delay time for each is equal to the scan time, and that this time is less than the synchronization point time (with respect to start time of the respective (I/O) timed functions.

Measurement

The timed function based techniques disclosed herein are not limited to control functions, and can also encapsulate measurement functionality. For measurement applications, there is generally only one synchronous event which signifies the start of the first sample (acquisition), and so in this case the minimum period may be set to the sample period, and the maximum period may specify the slowest data transfer update rate that the system application can support without overflowing its local buffer.

Figure 14:
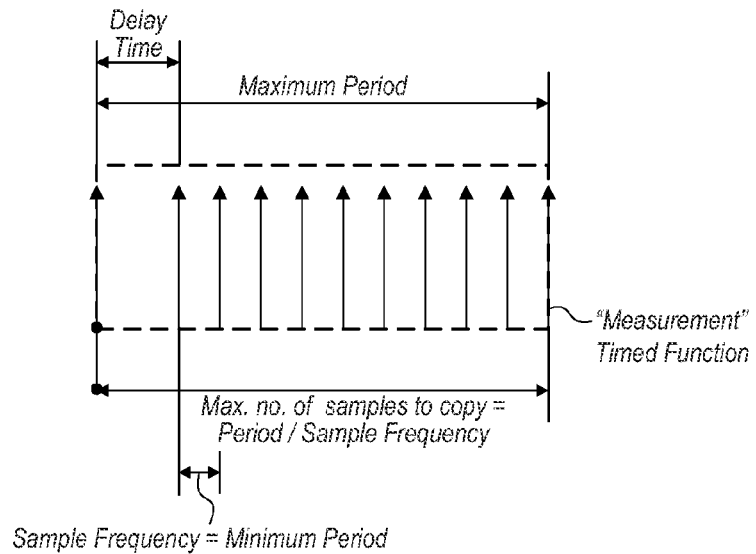
FIG. 14 illustrates an exemplary measurement function on a master device modeled or implemented as a timed function, according to one embodiment.

Said another way, the minimum period may be set to the inverse of the sample frequency. FIG. 14 illustrates an exemplary measurement function on a master device modeled or implemented as a timed function, according to one embodiment. As illustrated in FIG. 14, in this exemplary measurement application, the delay time may specify the time it takes for the first sample to be generated or updated. The WCET may be considered to be irrelevant and can be set to 0. The maximum period may bound the slowest period for the data transfer, and the number of samples available to copy every period may vary, and may depend on the period configured for the function and the sample size of the acquisition.

Figure 15:
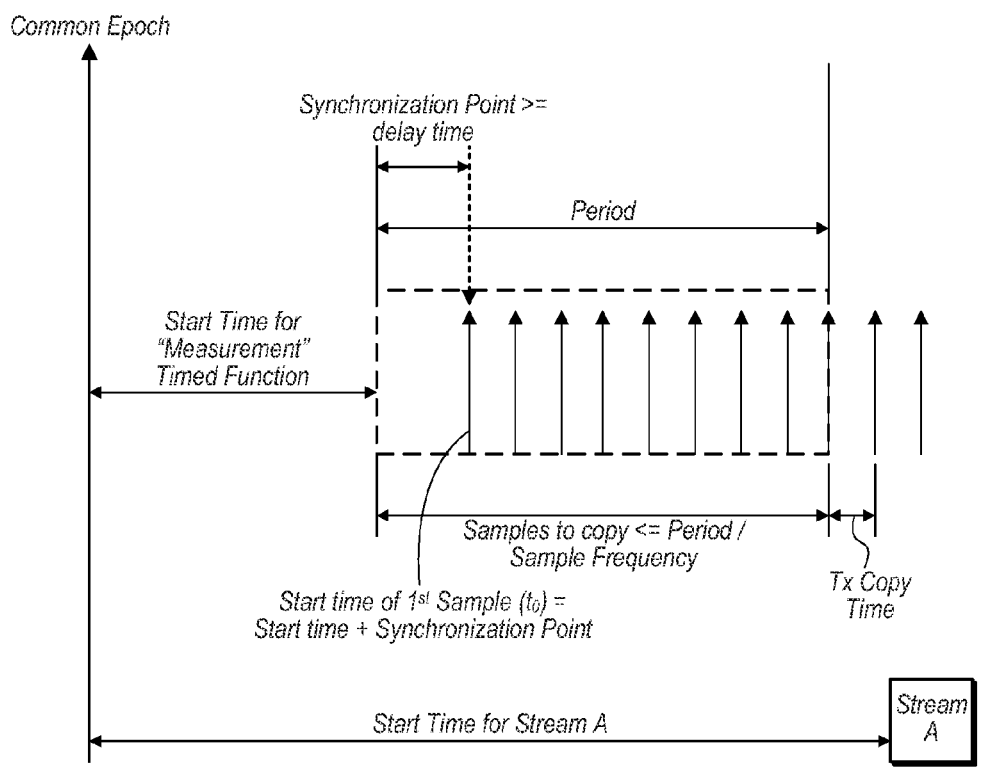
FIG. 15 illustrates an exemplary scheduled measurement function, according to one embodiment.

The at least one schedule generator may create a synchronization point that aligns the first sample with all other devices that need to be coordinated, and assuming that all the I/O devices are using the same synchronized clock, this will align acquisitions across multiple devices. Note that every sample may be synchronized if the sample frequency on all measurement functions is the same. The number of samples copied into the stream in its first iteration may be less than subsequent iterations. The real time stream may be scheduled as discussed in U.S. application Ser. No. 14/072,297, titled "Lossless Time Based Data Acquisition and Control in a Distributed System", which was incorporated by reference above. FIG. 15 illustrates an exemplary scheduled measurement function, according to one embodiment, where, as indicated, the start time of the first sample ($t_0$)=the start time of the "measurement" timed function+the synchronization point. Note that the number of samples to copy is less than or equal to the period divided by the sample frequency. Note further that the start time for transmission of stream A is the end of the period plus the transmission (Tx) copy time, as explained above.

Exemplary System Schedule

Figure 16:
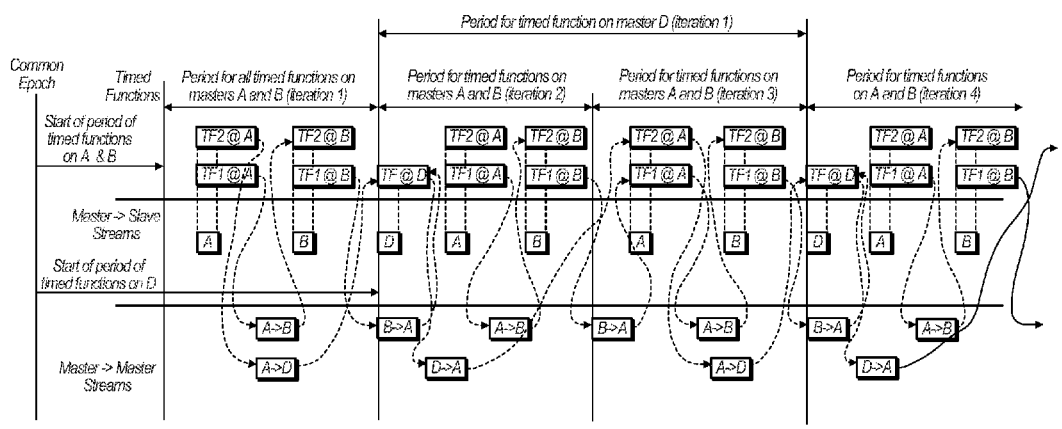
FIG. 16 illustrates an exemplary system schedule for an exemplary decentralized distributed system, according to one embodiment.

FIG. 16 illustrates an exemplary system schedule for an exemplary decentralized distributed system, according to one embodiment, e.g., for a system such as that shown in FIG. 3. As can be seen, this exemplary schedule represents multiple timed functions executing on multiple master devices, where timed functions executing on master device A are denoted as TF1@A and TF2@A, and a timed function executing on master D is denoted as TF@D. The schedule also illustrates various real time streams, where streams generated by A and consumed by B are labeled "A->B", streams generated by B and consumed by A are labeled "B->A". Note that the periods of the timed functions on A and B are the same, and the period of the timed-function of D is twice that of A and B (the timed-function on D runs every other period as the timed function on A and B). In some embodiments, the local streams to the slaves on each master are considered as part of the timed function. These local streams are denoted in FIG. 16 as A, B, and D, respectively.

The stream D->A contains data generated by the timed function executing on D, and these data are consumed by TF2@A on the next cycle when TF2@A executes. Data produced by TF2@A for TF@D is generated every other cycle that TF2@A executes. In FIG. 16, the dashed lines are meant to indicate the data-dependency between the timed functions via associativity of timed functions with streams. Note that the exemplary schedule shown also indicates during which iterations the various scheduled operations are performed, where the period for the timed function executing on master device D is twice as long as that for the timed functions of masters A and B.

This example also illustrates the two levels of schedule generation mentioned above, specifically, respective schedules for the timed functions and the streams based on data-dependency (associativity with streams) between the timed functions, where the schedule for timed functions is parallel to, but distinct from, that of the streams.

Thus, various embodiments of the techniques described herein may provide for improved control and other operations of decentralized distributed systems via the use of timed functions.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others. However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

The following describes various exemplary systems that may implement embodiments of the present techniques.

Figure 17A:
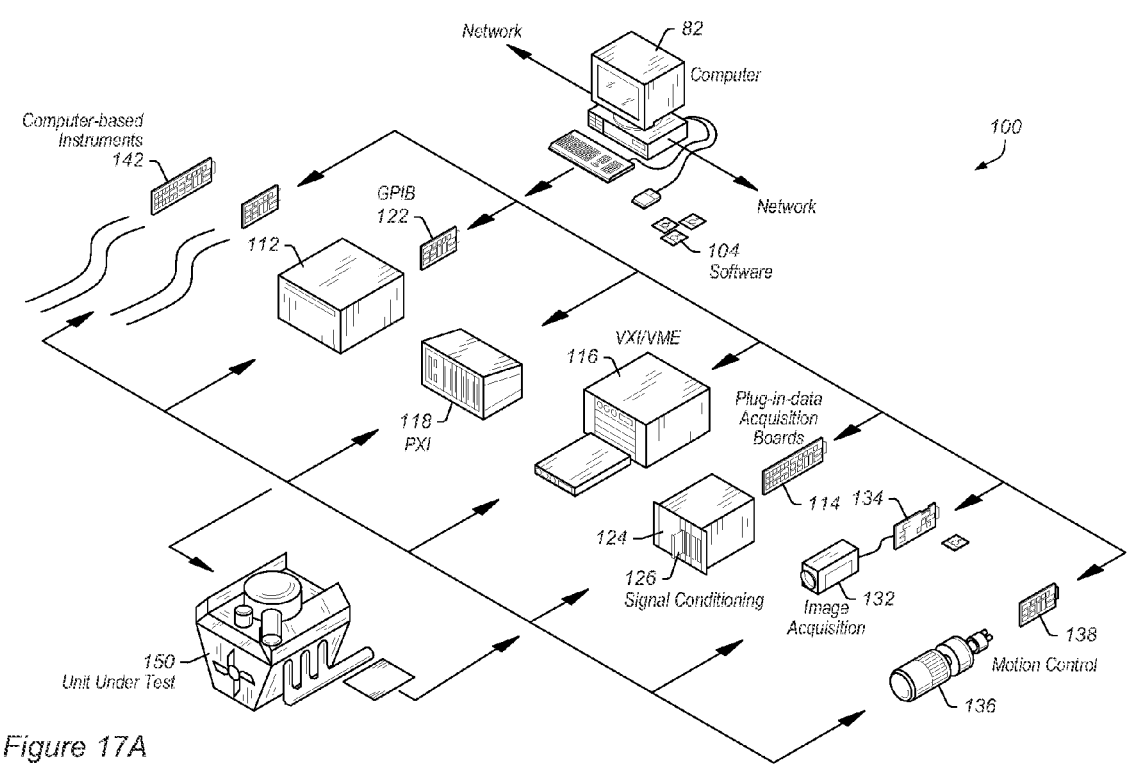
FIG. 17A illustrates an instrumentation control system according to one embodiment of the invention.

FIG. 17A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 17B:
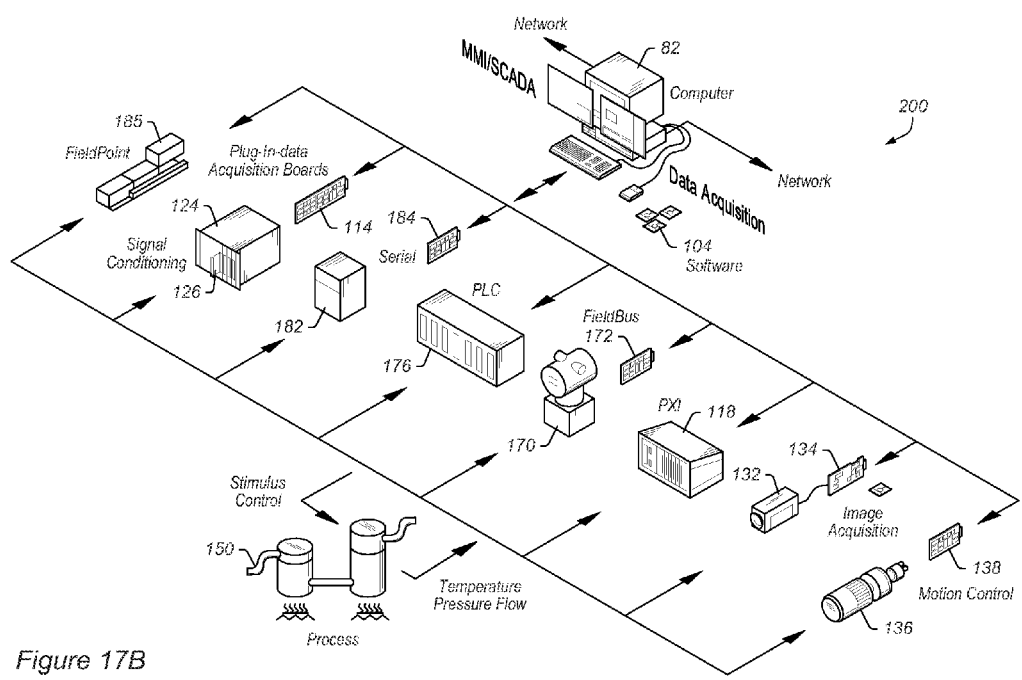
FIG. 17B illustrates an industrial automation system according to one embodiment of the invention.

FIG. 17B illustrates an exemplary industrial automation system 200 which may implement embodiments of the invention. The industrial automation system 200 is similar to the instrumentation or test and measurement system 100 shown in FIG. 17A. Elements which are similar or identical to elements in FIG. 17A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as HMI (Human Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 18A:
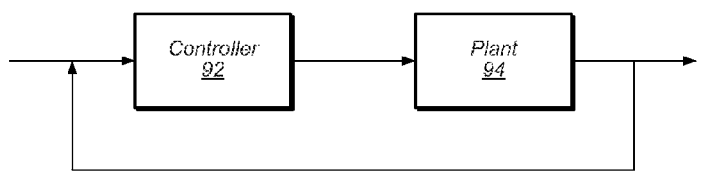
FIG. 18A is a high level block diagram of an exemplary system which may execute or utilize graphical programs.

FIG. 18A is a high level block diagram of an exemplary system which may execute or utilize graphical programs. FIG. 18A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 18B:
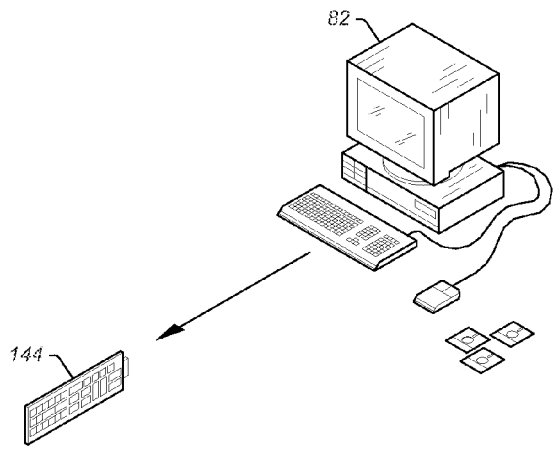
FIG. 18B illustrates an exemplary system which may perform control and/or simulation functions utilizing graphical programs.

FIG. 18B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 17A, 17B, and 18B above, one or more of the various devices may couple to each other over a network, such as the Internet. In one embodiment, the user operates to select a target device from a plurality of possible target devices for programming or configuration using program, e.g., a graphical program. Thus the user may create a (possibly graphical) program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 17A and 17B, may be referred to as virtual instruments. It should be noted that in various embodiments, one or more of the software (or firmware) program or components used to implement the present techniques, e.g., timed functions, schedule generator(s), etc., may be implemented in any kind of programs desired, including textual and/or graphical programs, e.g., graphical data flow programs.

Figure 19:
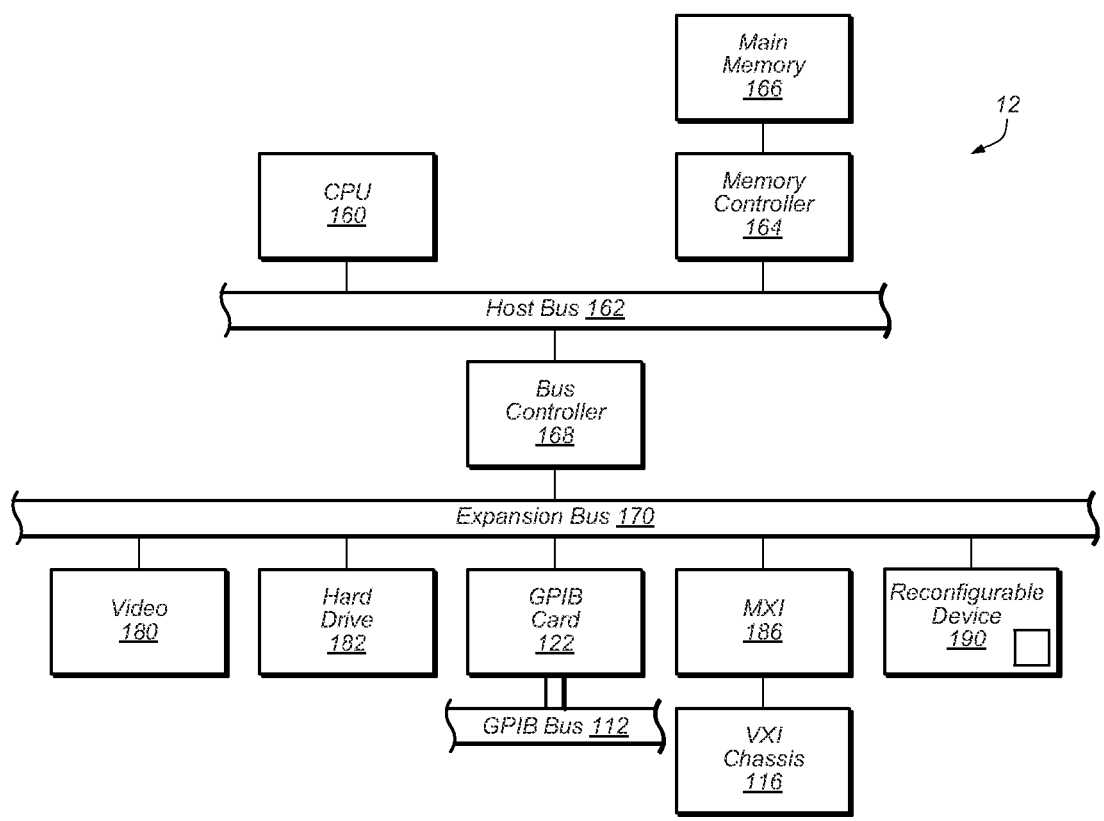
FIG. 19 is an exemplary block diagram of the computer systems of FIGS. 17A, 17B, 18A, and 18B.

FIG. 19 —Computer System Block Diagram

FIG. 19 is a block diagram 12 representing one embodiment of the computer system 82 in FIGS. 17A, 17B, and 18B. It is noted that any type of computer system configuration or architecture can be used as desired, and FIG. 19 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs implementing the techniques disclosed herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a (possibly graphical) program to the device 190 for execution of the program on the device 190. In some embodiments, the deployed program may be a graphical program, and may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Alternatively, the program may be a textual program.

The following describes exemplary creation of a graphical program, according to one embodiment. First, a graphical user interface or front panel for the graphical program may be created, e.g., in response to user input. The graphical user interface may be created in any of various ways, e.g., depending on the graphical programming development environment used. A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

Other techniques for creating graphical programs may be used as desired, e.g., programmatically, or a combination of manual and programmatic techniques.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus for scheduling a decentralized distributed real time system, comprising:
   a memory element configured to store first information; and
   at least one centralized configuration device, configured to use at least a portion of the stored first information to implement at least one schedule generator, wherein the at least one centralized configuration device is configured to couple to a plurality of master devices, wherein each master device of the plurality of master devices is connected to a respective plurality of slave devices;
   wherein each master device comprises respective one or more timed functions which, when locally executed by the master device, control timing of:
      physical input operations and/or physical output operations for the respective plurality of slave devices connected to the master device; and
      streams between the master device and the respective plurality of slave devices connected to the master device;
   wherein, for each master device, the at least one schedule generator is configured to:
      receive respective second information indicating:
         a respective set of temporal properties for each timed function of the respective one or more timed functions on the master device, wherein each respective set of temporal properties pertains to:
            execution of the timed function; and
            coordination of the physical input operations and/or physical output operations of slave devices under control of the timed function with respect to other timed functions; and
         associations between the respective one or more timed functions and respective second streams communicated between the master device and other ones of the plurality of master devices;
      generate a respective schedule for the master device, based at least in part on the respective second information, wherein the respective schedule, when used by the master device, enables the master device to:
         execute and coordinate the respective one or more timed functions in real time according to the respective schedule; and
         coordinate the respective second streams between the master device and the other ones of the plurality of master devices in real time according to the respective schedule; and
      distribute the respective schedule to the master device.

2. The apparatus of claim 1, wherein each slave device is configured to:
   perform physical input operations, and generate streams to send to its master device; and/or
   perform physical output operations, and consume streams from its master device.

3. The apparatus of claim 1, wherein each master device further comprises a network interface configured to communicate its respective second streams to and from the other ones of the plurality of master devices based on the respective schedule of the master device.

4. The apparatus of claim 1, wherein each respective schedule further comprises:
   timing information for transmission of streams, of the respective second streams, produced by the master device to the other ones of the plurality of master devices.

5. The apparatus of claim 1, wherein the other timed functions comprise one or more of:
   other timed functions comprised in the respective one or more timed functions; or
   other timed functions comprised in one or more timed functions executed on the other ones of the plurality of master devices.

6. The apparatus of claim 1, wherein the at least one schedule generator is further configured to:
   receive system application requirements; and
   receive network constraints and network topology information;
   wherein the respective schedule for each master device is generated further based on the system application requirements, and the network constraints and network topology information.

7. A decentralized distributed real time system, comprising:
   a plurality of interconnected master devices, wherein each master device of the plurality of interconnected master devices couples to a respective plurality of slave devices, wherein each master device is configured to:
      execute one or more timed functions, wherein each executed timed function of the executed one or more timed functions:
         controls timing of physical input operations and/or physical output operations for the respective plurality of slave devices coupled to the master device; and
         controls timing of streams between the master device and the respective plurality of slave devices coupled to the master device;
      export information indicating:
         a respective set of temporal properties for each timed function of the one or more timed functions, wherein each respective set of temporal properties pertains to:
            execution of the timed function; and
            coordination of the physical input operations and/or physical output operations of slave devices under control of the timed function with respect to other timed functions; and
         associations between the one or more timed functions and respective second streams communicated between-the master device and other ones of the plurality of interconnected master devices;

receive a respective schedule generated based at least in part on each exported information;

execute and coordinate the one or more timed functions in real time according to the respective schedule; and coordinate the respective second streams between the master device and the other ones of the plurality of interconnected master devices in real time according to the respective schedule.

8. The decentralized distributed real time system of claim 7, wherein each slave device is configured to:

perform physical input operations, and generate streams to send to its master device; and/or perform physical output operations, and consume streams from its master device.

9. The decentralized distributed real time system of claim 7, wherein each master device further comprises a network interface configured to communicate its respective streams to and from the other ones of the plurality of master devices based on the respective schedule of the master device.

10. The decentralized distributed real time system of claim 7, wherein the respective schedule further comprises:

timing information for transmission of streams, of the respective second streams, produced by the master device to the other ones of the plurality of master devices.

11. The decentralized distributed real time system of claim 7, wherein the other timed functions comprise one or more of:

other timed functions comprised in the one or more timed functions; or other timed functions comprised in one or more timed functions executed on the other ones of the plurality of master devices.

12. The decentralized distributed real time system of claim 7, further comprising:

at least one centralized configuration device, coupled to the plurality of master devices, and comprising at least one schedule generator, wherein, for each master device, the schedule generator is configured to:

receive the exported information;

generate the respective schedule based at least on the received exported information; and distribute the respective schedule to the master device.

13. The decentralized distributed real time system of claim 12, wherein the at least one schedule generator is further configured to:

receive system application requirements; and receive network constraints and network topology information;

wherein the respective schedule for each master device is generated further based on the system application requirements, and the network constraints and network topology information.

14. A method for generating a schedule for a decentralized distributed real time system, comprising:

performing, by at least one schedule generator executing on at least one centralized configuration device coupled to a plurality of master devices, wherein each master device of the plurality of master devices is coupled to a respective plurality of slave devices, wherein each master device comprises respective one or more timed functions, which, when locally executed by the master device, control timing of:

physical input operations and/or physical output operations for the respective plurality of slave devices connected to the master device; and streams between the master device and the respective plurality of slave devices connected to the master device:

for each respective master device:

receiving respective information indicating:

a respective set of temporal properties for each timed function of the respective one or more timed functions on the respective master device, wherein each respective set of temporal properties pertains to:

execution of the timed function; and coordination of the physical input operations and/or physical output operations of slave devices under control of the timed function with respect to other timed functions; and associations between the respective one or more timed functions and respective second streams communicated between the master device and other ones of the plurality of interconnected master devices;

generating a respective schedule for the master device based at least in part on the respective information, wherein the respective schedule, when used by the master device, enables the master device to:

execute and coordinate the respective one or more timed functions of the master device in real time according to the respective schedule; and coordinate the respective second streams between the master device and the other ones of the plurality of interconnected master devices in real time according to the respective schedule; and distributing the respective schedule to the master device.

15. The method of claim 14, wherein each slave device is configured to:

perform physical input operations, and generate streams to send to its master device; and/or perform physical output operations, and consume streams from its master device.

16. The method of claim 14, wherein each master device further comprises a network interface configured to communicate its respective second streams to and from the other ones of the plurality of interconnected master devices based on the respective schedule of the master device.

17. The method of claim 14, wherein each respective schedule further comprises:

timing information for transmission of streams, of the respective second streams, produced by the master device, to the other ones of the plurality of interconnected master devices.

18. The method of claim 14, wherein the other timed functions comprise one or more of:

other timed functions comprised in the respective one or more timed functions; or other timed functions comprised in one or more timed functions executed on the other ones of the plurality of master devices.

19. The method of claim 14, further comprising:

the at least one schedule generator performing:

receiving system application requirements; and receiving network constraints and network topology information;

wherein said generating the respective schedule for the master device is further based on the system application requirements, and the network constraints and network topology information.

20. A non-transitory computer accessible memory medium that stores program instructions implementing at least one schedule generator for a decentralized distributed real time system, wherein the program instructions are executable by at least one centralized configuration device coupled to a plurality of master devices, wherein each master device of the plurality of master devices is coupled to a respective plurality of slave devices, wherein each master device comprises respective one or more timed functions, which, when locally executed by the master device, control timing of:
   physical input operations and/or physical output operations for the respective plurality of slave devices connected to the master device; and
   streams between the master device and the respective plurality of slave devices connected to the master device;
   wherein the program instructions are executable by the at least one centralized configuration device to implement for each respective master device:
   receiving respective information indicating:
      a respective set of temporal properties for each timed function of the respective one or more timed functions on the master device, wherein each respective set of temporal properties pertains to:
         execution of the timed function; and
         coordination of the physical input operations and/or physical output operations of slave devices under control of the timed function with respect to other timed functions; and;
      associations between the respective one or more timed functions and respective second streams communicated between the master device and the other ones of the plurality of master devices;
   generating a respective schedule for the master device based at least in part on the respective information, wherein the respective schedule, when used by the master device, enables the master device to:
      execute and coordinate the respective one or more timed functions of the master device in real time according to the respective schedule; and
      coordinate the respective second streams between the master device and the other ones of the plurality of master devices in real time according to the respective schedule; and
   distributing the respective schedule to the master device.

21. The non-transitory computer accessible memory medium of claim 20, wherein each slave device is configured to:
   perform physical input operations, and generate streams to send to its master device; and/or
   perform physical output operations, and consume streams from its master device.

22. The non-transitory computer accessible memory medium of claim 20,
   wherein each master device further comprises a network interface configured to communicate its respective second streams to and from the other ones of the plurality of master devices based on the respective schedule of the master device.

23. The non-transitory computer accessible memory medium of claim 20, wherein each respective schedule further comprises:
   timing information for transmission of streams, of the respective second streams, produced by the master device, to the other ones of the plurality of master devices.

24. The non-transitory computer accessible memory medium of claim 20, wherein the other timed functions comprise one or more of:
   other timed functions comprised in the respective one or more timed functions; or
   other timed functions comprised in one or more timed functions executed on the other ones of the plurality of master devices.

25. The non-transitory computer accessible memory medium of claim 20, wherein the program instructions are further executable to implement:
   receiving system application requirements; and
   receiving network constraints and network topology information;
   wherein said generating the respective schedule is further based on the system application requirements, and the network constraints and network topology information.

* * * * *